United States Patent [19]
Conant

[11] Patent Number: 6,106,795
[45] Date of Patent: *Aug. 22, 2000

[54] LIQUID HYDRATE REGENERATION OF CONTAMINATED ACIDS

[75] Inventor: Lawrence D. Conant, West Bridgewater, Mass.

[73] Assignee: Waterworks International, Woburn, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/790,512

[22] Filed: Jan. 29, 1997

[51] Int. Cl.<sup>7</sup> .................................. C01B 17/90
[52] U.S. Cl. .......................... 423/531; 210/737
[58] Field of Search ................ 423/394.2, 531, 423/523, 524, 522, DIG. 2, 558; 62/532; 210/696, 737

[56] References Cited

U.S. PATENT DOCUMENTS

| | | | |
|---|---|---|---|
| 2,862,791 | 12/1958 | Stiles et al. | 23/172 |
| 3,890,097 | 6/1975 | Minor | 23/300 |
| 4,169,054 | 9/1979 | Cappello et al. | 210/71 |
| 4,394,364 | 7/1983 | Hakl | 423/531 |
| 4,740,281 | 4/1988 | Chlanda et al. | 588/243 |
| 4,894,170 | 1/1990 | Billmyre | 210/712 |
| 5,394,706 | 3/1995 | Keus | 62/123 |

FOREIGN PATENT DOCUMENTS

| | | |
|---|---|---|
| 52-14 0497 | 11/1977 | Japan. |
| 796343 | 6/1958 | United Kingdom. |

OTHER PUBLICATIONS

Zeleznik, *Thermodynamic Properties of the Aqueous Sulfuric Acid System to 350 K*, J. Phys.Chem.Ref.Data, v. 20, n. 6 (1991) no month.

Giauque et al., *The Thermodynamic Properties of Aqueous Sulfuric Acid Solutions and Hydrates from 15 to 300°K*, J. Am.Chem.Soc., 82, 62–70 (1960) no month.

Rubin et al., *The Heat Capacities and Entropies of Sulfuric Acid and Its Mono- and Dihydrates*, J.Am.Chem.Soc., 74, 800–803 (1952) no month.

Kunzler et al., *The Freezing Point Curves of Concentrated Aqueous Sulfuric Acid*, J.Am.Chem.Soc., 74 5271–5274 (1952) no month.

Gable et al., *Phase Equilibria of the System Sulfur Trioxide–Water*, J.Am.Chem.Soc., 72, 1445–48 (Apr. 1950).

Hornung et al., *The Hear Capacities and Entropies of Sulfuric Acid Tri- and Tetrahydrates*, J.Am.Chem.Soc., 77, 2983–87 (1955) no month.

Hornung et al., *The Low Temperature Heat Capacity and Entropy of Sulfuric Acid Hemihexahydrate. Some Observations on Sulfuric Acid "Octahydrate"*, J.Am.Chem.Soc., 78, 5747–51 (Nov. 1956).

Refrigeration Resources, *Chill Steel–Picking Acids to Ease Metals Recovery*, Chemical Engineering, 186C (Nov. 1995).

Zhang et al., *Vapor Pressure Measurements for the $H_2SO_4/HNO_3/H_2O$ and $H_2SO4/HCl/H_2O$ Systems: Incorporation of Stratospheric Acids into Background Sulfate Aersols*, J.Chem.Phys., 97, 8541–48 (1993) no month.

Jaecker–Voirol et al., *Vapor Pressures in the Ternary System Water–Nitric Acid–Sulfuric Acid at Low Temperatures*, J.Geophys.Res., 95, n. D8, 11,857–63 (1990) no month.

Worsnop et al., *Vapor Pressures of Solid Hydrates of Nitric Acid: Implications for Polar Stratospheric Clouds*, Science, 259, 71–74 (Jan. 1993).

*Primary Examiner*—Steven P. Griffin
*Assistant Examiner*—Stuart L. Hendrickson
*Attorney, Agent, or Firm*—Morgan, Lewis & Bockius LLP

[57] ABSTRACT

A process and apparatus for the regeneration of contaminated acid. The process involves cooling the contaminated acid to a lower temperature sufficient to form at least one liquid hydrate of the acid without forming a solid hydrate of the acid, maintaining the contaminated acid at the lower temperature for a time sufficient to form at least one liquid hydrate of the acid and precipitate an amount of the contaminants, separating the precipitated contaminants from the cooled acid, and warming the acid to decompose the liquid hydrate.

20 Claims, 4 Drawing Sheets and the acid concentrates. As the acid concentrates, the solubility of the contaminants in the acid decreases and the contaminants precipitate out. The precipitated contaminants are then separated from the acid. The acid is subsequently warmed, decomposing the hydrate and regenerating the acid.

LIQUID HYDRATE REGENERATION OF CONTAMINATED ACIDS

TECHNICAL FIELD

This invention relates to a method and apparatus for regenerating contaminated acids through the formation of liquid hydrates. In particular, this invention relates to a method for purifying contaminated sulfuric and nitric acids, and mixtures thereof, by cooling the acid to a temperature sufficient to form a liquid hydrate of the acid.

BACKGROUND ART

Contaminated (or spent) acids streams are generated by a number of important industrial processes. For economic and environmental reasons, it is desirable to regenerate these contaminated acids so that they may be reused rather than discarded. One method of regenerating acids to remove contaminants is distillation. While generally effective, distillation methods require high temperatures and special materials to withstand the conditions required to boil acids. The combined cost of the distillation equipment and the high energy requirements make distillation a less attractive alternative for some industries. Another regeneration method involves cooling the contaminated acid to promote precipitation of the contaminants. Such a method is used by the metal pickling industry to regenerate contaminated sulfuric acid. During the metal pickling process, sulfuric acid becomes contaminated with metals and organic fluids. The common practice is to cool the sulfuric acid from its operating temperature, about 330° K., to 273° K. At this lower temperature, the solubility of the metals is lower and some of the contaminants precipitate out. Once the contaminants are separated from the acid, the acid bath is returned to its normal operating temperature. This process extends the life of the acid bath and minimizes the cost of neutralizing the acid prior to disposal. However, this process is not as effective in removing contaminants as the distillation processes. Thus, it would be an advantage to have a regeneration process having a greater ability to remove contaminants without involving distillation.

SUMMARY OF THE INVENTION

It is an object of the invention to obviate the disadvantages of the prior art.

It is another object of the invention to provide a method for regenerating contaminated acid without using distillation or generating solid hydrates.

It is a further object of the invention to provide an apparatus for regenerating contaminated acids.

In accordance with one aspect the invention, a method for regenerating contaminated acid is provided comprising cooling the contaminated acid to a lower temperature sufficient to form at least one liquid hydrate of the acid without forming a solid hydrate of the acid, maintaining the contaminated acid at the lower temperature for a time sufficient to form at least one liquid hydrate of the acid and precipitate an amount of the contaminants, separating the precipitated contaminants from the cooled acid, and warming the acid to decompose the liquid hydrate.

In accordance with another aspect of the invention, an apparatus is provided for regenerating contaminated acid, comprising: a tank for containing the contaminated acid, a reactor for cooling the acid to a lower temperature sufficient to form at least one liquid hydrate of the acid, the reactor having a jacket connected to a source of refrigerated coolant, a pump connected between the tank and the reactor to transfer the contaminated acid from the tank to the reactor, a separator column connected to the reactor to receive the cooled acid, the separator column having a discharge port to remove settled contaminants and an output port for a regenerated acid stream, the separator column being sized to allow sufficient time for the liquid hydrate to form.

In accordance with a further aspect of the invention, the apparatus further includes a second pump connected between the separator column and the reactor to recycle an amount of the cooled acid in the separator back into the reactor, a temperature probe attached to the output port, and a control valve connected to the output port to receive the regenerated acid stream. The control valve being responsive to a signal from the temperature probe and being capable of diverting the regenerated acid stream into separate conduits.

DESCRIPTION OF THE PREFERRED EMBODIMENTS

Figure 1:
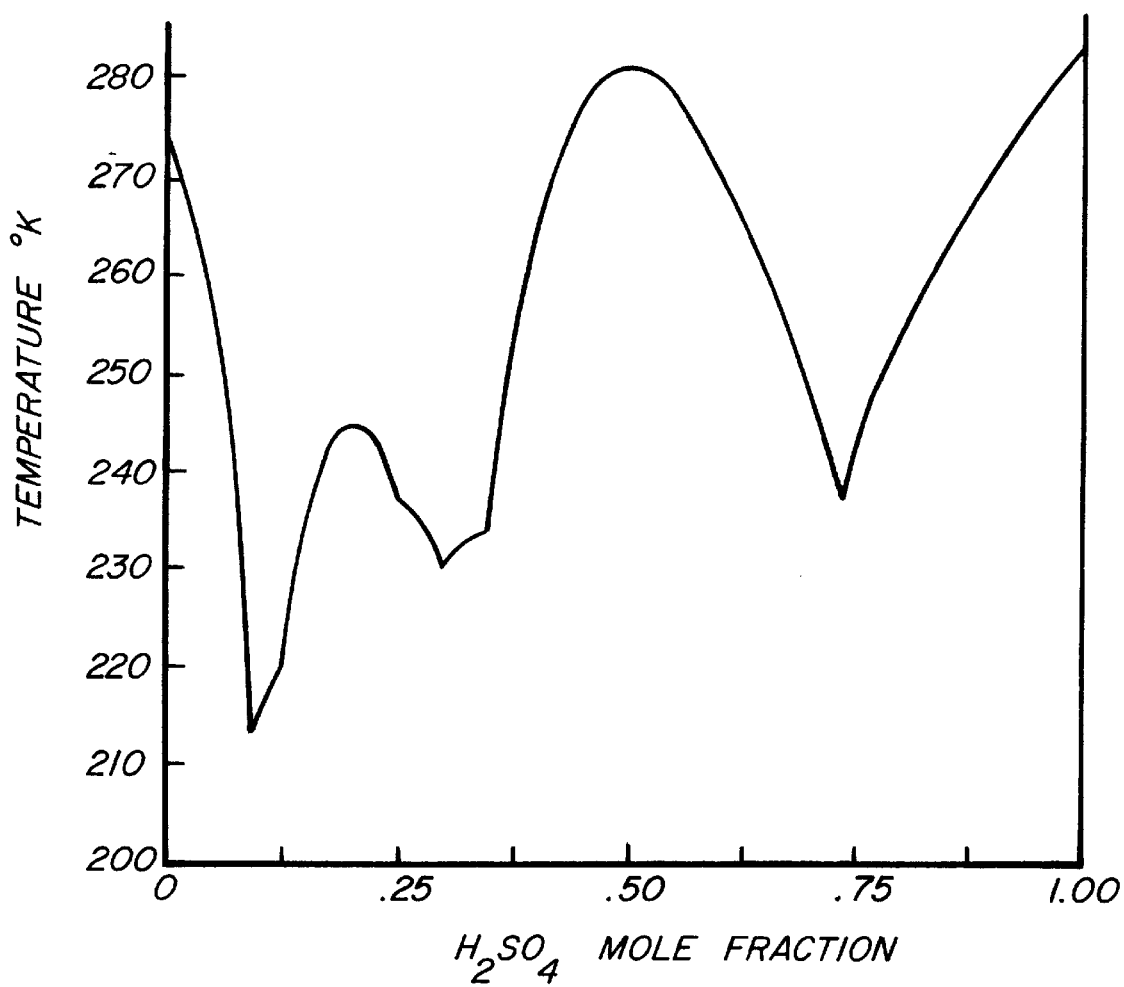
FIG. 1 is graphical representation of the freezing point curve for the water/sulfuric acid binary system.

For a better understanding of the present invention, together with other and further objects, advantages and capabilities thereof, reference is made to the following disclosure and appended claims taken in conjunction with the above-described drawings.

In general, hydrates are a class of compounds which contain molecular water. Some hydrates may exist in either solid or liquid form, e.g., sulfuric acid hydrates. This invention provides a more efficient means of acid regeneration by making use of the liquid hydrate phase.

The formulas for hydrated compounds are usually represented in the form $A.xH_2O$ where A is the anhydrous form of the compound and x is the number of molecules of water associated with each molecule of the anhydrous compound. Hydrates decompose upon heating to yield water and a less hydrated form of the original hydrate. It is not necessary that the hydrate completely decompose upon heating. For example, sodium carbonate decahydrate will decompose to sodium heptahydrate and water according to the following reaction.

$$Na_2CO_3 \cdot 10H_2O \underset{\Delta}{\rightarrow} Na_2CO_3 \cdot 7H_2O + 3H_2O$$

In this invention, acid regeneration (or purification) is accomplished by reducing the temperature of the contaminated acid solution to a temperature between the temperature at which a liquid hydrate of the acid forms and the temperature at which the solid hydrate forms (freezing point). Once cooled, the lower temperature is maintained to promote the formation of the liquid hydrate. As the hydration reaction proceeds, water is removed from the solution because the water molecules are combining with the acid molecules to form the liquid hydrate. As the water is removed, the concentration of the contaminants in the remaining water increases causing the contaminants to precipitate out of solution. After the precipitated contaminants are removed, the hydrated acid can be warmed to decompose the liquid hydrate and reused. The amount of contaminants removed from the acid is significantly greater than the amount expected from the predictable decrease in solubility caused by the lowered temperature itself.

The regeneration process also applies where the contaminated acid contains a less hydrated form of the acid which then forms a more hydrated form upon cooling the acid to the formation temperature of the more hydrated form. In any case, it is important not to cool the acid until solid acid hydrates form because (1) the formation of solid hydrate crystals complicates the removal of the precipitated contaminants and (2) the energy used in forming the solid hydrate crystals is wasted since no additional water is removed from the acid solution by forming the solid hydrate.

Two commercially important acids which can benefit from this method are sulfuric acid and nitric acid and mixtures thereof. For aqueous sulfuric acid, the formation of sulfuric acid hydrates has been studied extensively. A compilation of the relevant thermodynamic data for the sulfuric acid-water system has been reported by F. Zeleznik, *Thermodynamic Properties of the Aqueous Sulfuric Acid System to 350 K*, J. Phys. Chem. Ref. Data, v. 20, n. 6 (1991), which is incorporated herein by reference.

In order to regenerate the contaminated acids, the temperature and pressure conditions at which the liquid hydrates form must be determined. Unfortunately, the temperature region in which the liquid hydrates of these acids form has been largely ignored. In the case of sulfuric acid, the liquid hydrate formation temperatures may be determined using the data complied by Zeleznik. If the chemical potential data for each mole fraction is plotted versus temperature, it becomes apparent that there is a marked change in the chemical potential at temperatures which are above the freezing curve. Since various hydrated forms of sulfuric acid are known to exist at low temperatures, it is reasonable to expect that those hydrates exist in liquid form at temperatures warmer than the freezing point. FIG. 1 shows the freezing point curve for the sulfuric acid- water binary system. The solid sulfuric acid hydrates form at temperatures below the freezing curve. Table 1 lists the hydrates which form at low temperatures for the sulfuric acid/water binary system for the various mole fraction ranges of sulfuric acid between 0.024 and 0.50.

TABLE 1

| Mole Fraction $H_2SO_4$ | Hydrate |
| --- | --- |
| 0.024–0.111 | octahydrate and water |
| 0.011–0.133 | octahydrate and hemihexahydrate |
| 0.113–0.20 | hemihexahydrate and tetrahydrate |
| 0.20–0.25 | trihydrate and tetrahydrate |
| 0.25–0.33 | trihydrate and dihydrate |
| 0.33–0.50 | dihydrate and monohydrate |

The preferred method for determining the temperature of formation of the liquid hydrates is to use the available Free Energy data. An analysis of Free Energy data for the sulfuric acid-water system shows the same non-linearity seen in the plots of the chemical potential for the different mole fractions. Specifically, for each mole fraction, a plot of Free Energy as a function of temperature resolves into two distinct lines. The intersection of these lines, $T_g(°K.)$, is the formation temperature of the liquid hydrates and is equal to $(b_2-b_1)/(m_1-m_2)$ where $b_1$ and $b_2$ are the intercepts and $m_1$ and $m_2$ are the slopes for the two lines. At temperatures at, or below, $T_g(°K.)$, the liquid hydrates of sulfuric acid begin to form. Generally, the reaction rate for the liquid hydrate formation is slow and the acid must be maintained at the lower temperature to allow sufficient time for the liquid hydrate to form. For sulfuric acid, several hours are required to complete the hydration reaction whereby substantially all of the liquid hydrate is formed. It is preferred that the temperature be maintained at, or below, $T_g(°K.)$ to yield a formation time of at least about 6 hours, more preferably at least about 12 hours, and most preferably at least about 18 hours. The regeneration method can be operated near or on the freezing point curve as long as not enough energy is removed from the system to promote crystallization. It is preferred that the acid be agitated to prevent super cooling leading to spontaneous solid hydrate crystallization.

The values of $T_g(°K.)$ for each mole fraction of sulfuric acid within the preferred $H_2SO_4$ mole fraction range of about 0.02 to about 0.40 are given in Table 2 together with the slopes and intercepts of the two lines. For each mole fraction, the formation temperature is about 267° K. Sulfuric acid solutions having a $H_2SO_4$ mole fraction less than about 0.02 can be brought within the preferred range by combining with a more concentrated acid solution. Sulfuric acid solutions having $H_2SO_4$ mole fractions above 0.40 can be diluted with water or a dilute acid to fall within the preferred range.

TABLE 2

| mole fraction $H_2SO_4$ | $b_1$ (J/mole) | $m_1$ (J/mole ° K.) | $b_2$ (J/mole) | $m_2$ (J/mole ° K.) | Tg (° K.) |
| --- | --- | --- | --- | --- | --- |
| 0.02 | 5.150 | −0.0172 | 0.466 | 0.000384 | 266.40 |
| 0.04 | 6.614 | −0.0205 | 1.477 | −0.00129 | 266.80 |
| 0.06 | 8.018 | −0.0238 | 2.420 | −0.00287 | 267.02 |
| 0.08 | 9.336 | −0.0270 | 3.297 | −0.00436 | 267.13 |
| 0.10 | 10.558 | −0.0299 | 4.107 | −0.00574 | 267.16 |
| 0.12 | 11.682 | −0.0326 | 4.853 | −0.00702 | 267.15 |
| 0.14 | 12.712 | −0.0351 | 5.534 | −0.00818 | 267.15 |
| 0.16 | 13.652 | −0.0373 | 6.153 | −0.0924 | 267.14 |
| 0.18 | 14.507 | −0.0394 | 6.710 | −0.0102 | 267.13 |
| 0.20 | 15.283 | −0.0413 | 7.207 | −0.0110 | 267.13 |
| 0.22 | 15.984 | −0.0430 | 7.645 | −0.0117 | 267.13 |
| 0.24 | 16.614 | −0.0445 | 8.028 | −0.0124 | 267.15 |
| 0.26 | 17.177 | −0.0459 | 8.355 | −0.0129 | 267.17 |
| 0.28 | 17.676 | −0.0472 | 8.628 | −0.0133 | 267.21 |
| 0.30 | 18.113 | −0.0483 | 8.852 | −0.0136 | 267.25 |
| 0.32 | 18.490 | −0.0493 | 9.027 | −0.0139 | 267.26 |
| 0.34 | 18.809 | −0.0502 | 9.155 | −0.0140 | 267.29 |
| 0.36 | 19.071 | −0.0509 | 9.238 | −0.0141 | 267.29 |
| 0.38 | 19.279 | −0.0515 | 9.279 | −0.0141 | 267.93 |
| 0.40 | 19.434 | −0.0521 | 9.280 | −0.0141 | 267.27 |

For the nitric acid/water system, the heat of reaction for nitric acid hydration is not as large as it is for sulfuric acid hydration. From the available thermodynamic data for the $HNO_3/H_2O$ system, it is possible to calculate the parameters for the Claussius-Clapeyron equation: $\ln(p)=A_T-B_T/T$, where p is the pressure (torr), T is the temperature (°K) and $A_T$ and $B_T$ are constants over a defined temperature range. The constants for the Claussius-Clapeyron equation for various nitric acid hydrates are listed in Table 3.

TABLE 3

| Hydrate | $A_{213-273°K}$ | $A_{278-311°K}$ | $B_{213-273°K}$ | $B_{278-311°K}$ |
|---|---|---|---|---|
| monohydrate | 20.8879 | 20.1094 | 5283.5 | 5460.1 |
| dihydrate | 21.5294 | 20.2754 | 5719.6 | 5571.3 |
| trihydrate | 21.2098 | 20.7794 | 5623.4 | 5602.2 |
| decahydrate | 22.2414 | 21.3539 | 5669.7 | 5517.0 |

A plot of the form $\ln(p)=A_T-B_T/T$ for the temperature ranges indicated in Table 3 shows an overlap of pressure in the 273–278° K. range which indicates that the formation temperature for the liquid nitric acid hydrate is about 273° K. However, the heats of formation for the various nitric acid hydrates are so close to each other that determining the heat of formation does not allow the determination of the hydrated form present.

Reference data for $HNO_3/H_2O/H_2SO_4$ system in the 273° K. range can be found in the literature, e.g., R. Valdoni, *Contribution a l'etude des melanges sulfonitriques*, Mem. Serv. Chim. Etat, 31, 87–111 (1944). An interpretation of the data for this system indicates that sulfuric acid activity exists in the region approximately described by $X_{H2O}<0.6$ where $X_{H2O}$ is the mole fraction of water. The water activity is near or at zero in this region. The maximum sulfuric acid activity always occurs where the ratio of the mole fraction of water to the mole fraction of sulfuric acid is near unity, i.e., $X_{H2O}/X_{H2SO4} \cong 1$. This is equivalent to all of the water present being tied up as sulfuric acid monohydrate. Note that the 273° K. temperature is below the freezing point of pure sulfuric acid monohydrate in the region where $X_{H2O}<0.6$. The relatively lower heat of formation for the various nitric acid hydrates would not allow a determination of which nitric acid hydrates exist in this region.

Figure 2:
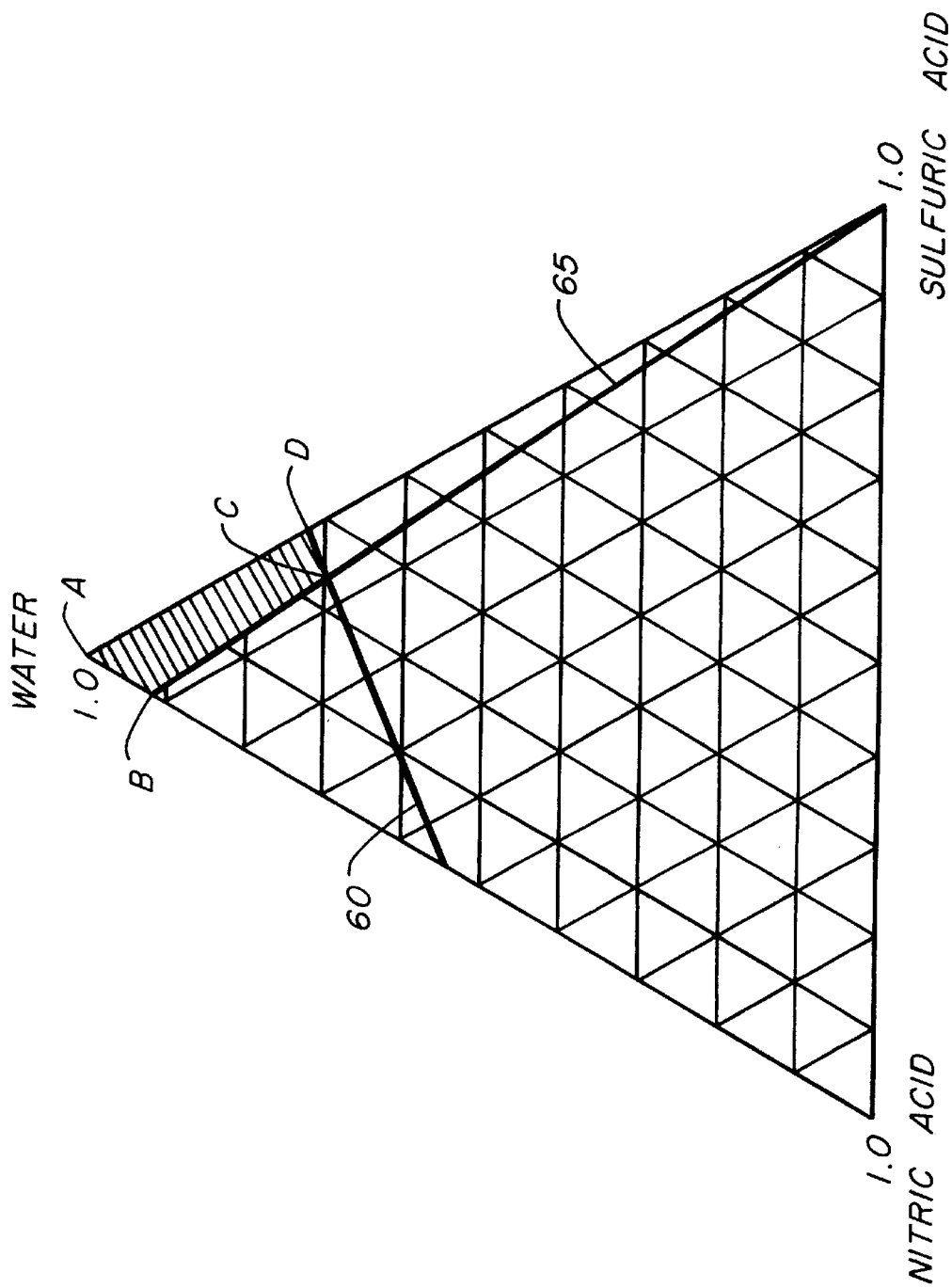
FIG. 2 is a graphical representation of the three component water/nitric acid/sulfuric acid system in triangular coordinates.

FIG. 2 is a phase diagram of the $HNO_3/H_2O/H_2SO_4$ system in triangular coordinates. The portion of the diagram where the water activity is non-zero, i.e., $X_{H2O}>0.6$, has two distinct regions: Region 1—the region of non-zero water activity where the mole fraction of $HNO_3$ is less than 0.09, $X_{HNO3}<0.09$ (nitric acid decahydrate) and Region 2—the region of non-zero water activity where $X_{HNO3}>0.09$. These two regions can be described by the following equations:

Region 1 $f_{H2O}=-2.6927+3.7627*X_{H2O}$

Region 2 $f_{H2O}=-1.1185+1.9885*X_{H2O}$ where $f_{H2O}$ is the water activity. The difference in water activity for Regions 1 and 2 reflects the existence of the nitric acid decahydrate in Region 2. Thus, in addition to the acid mixture covered by sulfuric acid monohydrate, the nitric acid decahydrate allows the regeneration process to work in the decahydrate region (Region 2).

Therefore, at 273° K., the concentration ranges for the $HNO_3/H_2O/H_2SO_4$ system which should benefit from the regeneration process are shown in FIG. 2. This region bound by the line where water activity is non-zero at $X_{HNO3}=0$ and the line for $X_{H2O}/X_{HNO3}=10$ at $X_{H2SO4}=0$ and the intersection of these two lines. The boundary for the zero water activity is shown by line 60 and is described by the equation $X_{H2O}=0.559+0.547*X_{H2SO4}$. The line for nitric acid decahydrate is shown as line 65 and is described by the equation $X_{H2O}/X_{HNO3}=10$. The intersection point for these two lines is ($X_{H2O}=0.691$, $X_{HNO3}=0.069$, and $X_{H2SO4}=0.24$). The concentrations where the regeneration process does not work at 273° K. is the shaded area bounded by the points A, (1.0, 0, 0), B, (0.909, 0.091, 0), C, (0.691, 0.069, 0.24) and D, (0.715, 0, 0.285), where the coordinates are ($X_{H2O}$, $X_{HNO3}$, $X_{H2SO4}$). The regeneration process is expected to work over the remainder of the concentrations.

The formation time of liquid hydrates is dependent upon the amount of time the acid solution is held at a temperature below the liquid hydrate formation temperature. It is possible to calculate an approximate time of liquid hydrate formation according to the formula:

$$T_0=T_1*M-T_2,$$

where $T_0$ is the formation time, $T_1$ is the residence time below the liquid hydrate formation temperature, M is the percentage of the mixture cooled below the hydrate formation temperature, and $T_2$ is the residence time above the hydrate formation temperature after forming the hydrate.

The following non-limiting examples are presented. These examples should not be considered as a limitation upon the scope of the invention, but merely as being illustrative and representative thereof.

Sulfuric Acid

For the following examples, a batch of 57.6% sulfuric acid (0.2 mole fraction) was prepared. This concentration is equivalent to the concentration needed to form sulfuric acid tetrahydrate. According to Table 2, the liquid hydrate formation temperature for this $H_2SO_4$ mole fraction is 267.13° K.

EXAMPLE 1

As a control, 3 grams of 99% $FeSO_4.7H_2O$ were added to 600 grams of the 57.6% sulfuric acid, mixed for 3 minutes and then allowed to stand for 30 minutes at 296.2° K. At this temperature, no hydrate formation is expected. The top half of the solution was decanted and measured for iron content using a colorometric technique (Hach 2000 Spectrophotometer, Method 8008 colorometric). The iron content was found to be 20 ppm Fe.

EXAMPLE 2

A mixture of 3 grams $FeSO_4.7H_2O$ and 57.6% sulfuric acid was prepared and measured as in Example 1 except the acid was first cooled to 261.2° K. over a five hour period prior to adding the iron sulfate (2.5 hours below 267° K.) and then allowed to stand at 261.2° K. for 30 minutes prior to decanting. After decanting, the decanted acid solution was found to have an iron content of 11.8 ppm Fe, a 41% reduction in the iron solubility when compared to the control in Example 1.

This example represents the effect of cooling to below the hydrate formation temperature with only a minimal time for hydrate formation (2.5 hour formation time). The lower iron solubility can be primarily attributed to the reduction in temperature alone because of the minimal time allowed for hydrate formation.

EXAMPLE 3

A mixture of 3 grams $FeSO_4.7H_2O$ and 57.6% sulfuric acid was prepared and measured as in Example 1 except the acid was first cooled to 262.3° K. and allowed to stand for 18 hours at 262.3° K. prior to adding the iron sulfate. After standing for 30 minutes and then decanting, the acid solution was found to have an iron content of 7.8 ppm Fe, a 61% reduction in iron solubility versus the control.

This example represents the effect of cooling to below the hydrate formation temperature, 267.13° K., and holding the acid at the lowered temperature for a time sufficient to allow for extensive hydrate formation (18 hour formation time). Compared to Example 2, it is evident that there is an additional reduction in the iron solubility when sufficient time is allowed for hydrate formation, a 61% reduction (Example 3) compared to a 41% reduction in solubility due to temperature alone (Example 2). The lowered iron solubility results from of the formation of liquid hydrate.

EXAMPLE 4

The experiments were modified by mixing 308 grams of 57.6% sulfuric acid which had been cooled to 262,3° K. and allowed to stand at that temperature for 18 hours with 292 grams of 57.6% sulfuric acid at 296.2° K., yielding an average formation time of 9.2 hours. After adding 3 grams of $FeSO_4 \cdot 7H_2O$, the acid was mixed for 3 minutes and then allowed to stand for 30 minutes at 284.5° K. After decanting, the iron content of the decanted acid was 9 ppm.

This example represents a mixture of old hydrate and cooled acid. Some decomposition of the liquid hydrate in the first acid solution is expected because the test temperature after mixing is above the hydrate formation temperature. A comparison with Example 2 indicates a greater reduction in iron solubility than that due to temperature alone. Here, the iron solubility was 55% lower than the control sample in Example 1. In Example 2, the solubility reduction due to temperature alone was 41%. This greater reduction in solubility is due to the presence of the liquid hydrate. A comparison with Example 3 shows that the reduction in Example 4 is slightly less, 55% vs. 61%, because the amount of liquid hydrate present is less due to the shorter formation time.

EXAMPLE 5

The acid mixture of Example 4 was further cooled to 269.3° K. over a period of 2.5 hours prior to the iron addition (a 6.65 hour average formation time). After decanting, the iron content of the acid was 10.3 ppm Fe which is a 48% reduction in iron solubility over the control. However, the decrease in iron solubility is not as great as 55% reduction observed in Example 4. Thus, there was an increase in iron solubility even though the temperature of the acid mixture was lower than in Example 4. The increase in iron solubility caused by the decomposition of the liquid hydrate (the temperature of the cooled acid was still above the liquid hydrate formation temperature, 267.13° K.) outweighed the expected decrease in solubility due to the lower temperature yielding an overall increase in the iron content of the acid as compared to Example 4. The results of Examples 2–5 are summarized in Table 4 and FIG. 3.

TABLE 4

| Example | Iron Content (ppm) | Formation Time (hours) |
| --- | --- | --- |
| 2 | 11.8 | 2.5 |
| 3 | 7.8 | 18 |
| 4 | 9.0 | 9.2 |
| 5 | 10.3 | 6.65 |

Figure 3:
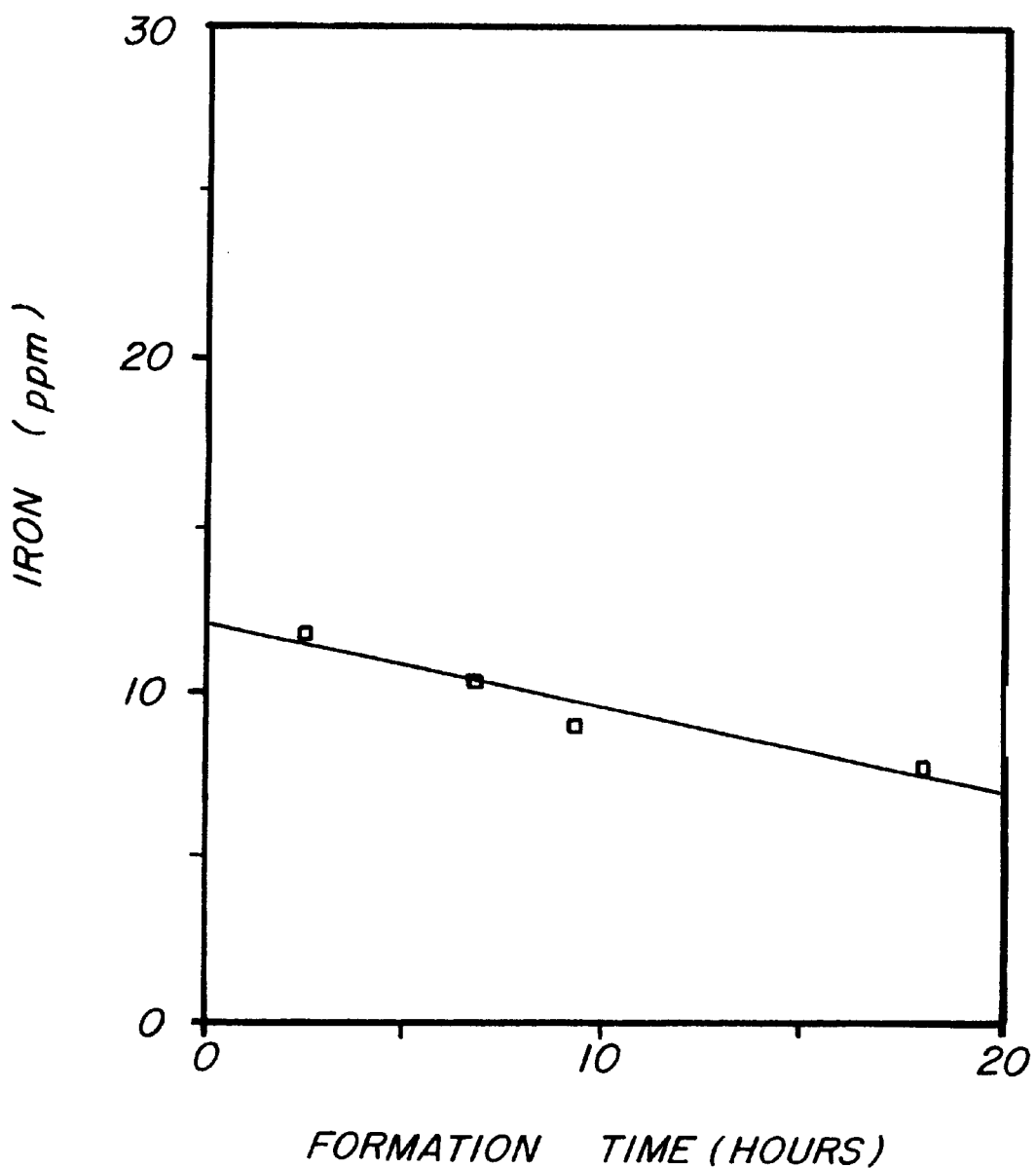
FIG. 3 is a graphical representation showing iron concentration in a sulfuric acid solution as a function of hydrate formation time.

As can be seen in FIG. 3, there is an apparent linear relationship between the iron content of the acid and the amount of liquid hydrate formation time. A linear regression analysis of the data in Table 4 yields the equation: $C(Fe) = 12 - 0.25 * T_0$, where $C(Fe)$ is the concentration of iron (ppm) and $T_0$ is the liquid hydrate formation time (hours). Thus, for every hour of formation time, there is an approximate 0.25 ppm decrease in the iron content.

Figure 4:
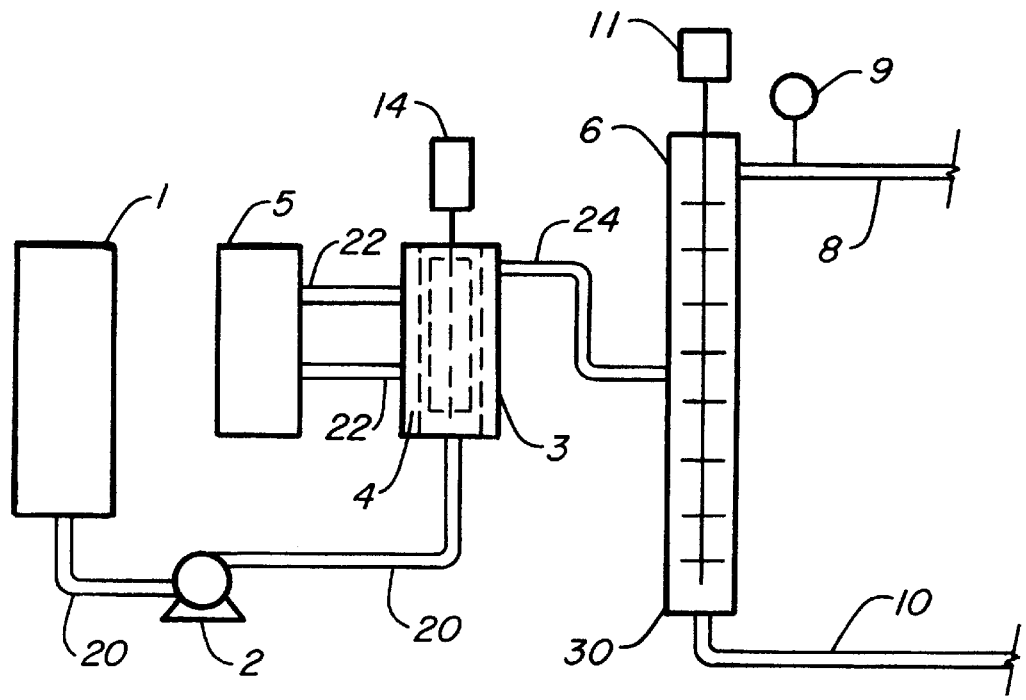
FIG. 4 is a schematic illustration of a liquid hydrate regeneration system.

FIG. 4 is a schematic of a basic liquid hydrate regeneration system. The spent acid tank 1 holds a quantity of contaminated acid to be fed into the jacketed reactor 3. Although a single spent acid tank is shown, it will be advantageous in many applications to mix various spent acid streams to achieve a desired concentration of acid or contaminants. Spent acid feed pump 2 transfers the contaminated acid from spent acid tank 1 through conduit 20 into jacketed reactor 3 having reactor jacket 4. Jacketed reactor 3 should have enough heat transfer surface to remove the amount of heat required to cause the formation of the desired liquid hydrate. Refrigeration system 5 supplies a refrigerated coolant to reactor jacket 4 through conduit 22 at a capacity sufficient to (i) cool the contaminated acid in the reactor 3 to, or below, the liquid hydrate formation temperature and (ii) remove the heat of formation. It is preferred that the contaminated acid be agitated while it is being cooled to promote heat transfer and prevent supercooling of the acid which may cause the undesired formation of solid hydrate crystals. Such agitation may be achieved using mixer 14.

Once the contaminated acid has been cooled to a point sufficient to form the liquid hydrate, the acid is transferred through insulated conduit 24 into separator column 6. Separator column 6 is insulated to prevent warming and sized to allow sufficient time for the formation of the liquid hydrate to near completion (or the reaction could be carried out in a batch separator column). Separator column 6 may also be fitted with a mixer 11. As the liquid hydrate forms, contaminants precipitated from the acid settle to the bottom 30 of separator 6 and are removed through discharge port 10. The regenerated acid is removed through output port 8. The temperature of the regenerated acid stream passing through output port 8 can be monitored by temperature probe 9. If necessary, the regenerated acid stream may be sent to a liquid separator, not shown, to remove any floating organic contaminants.

Figure 5:
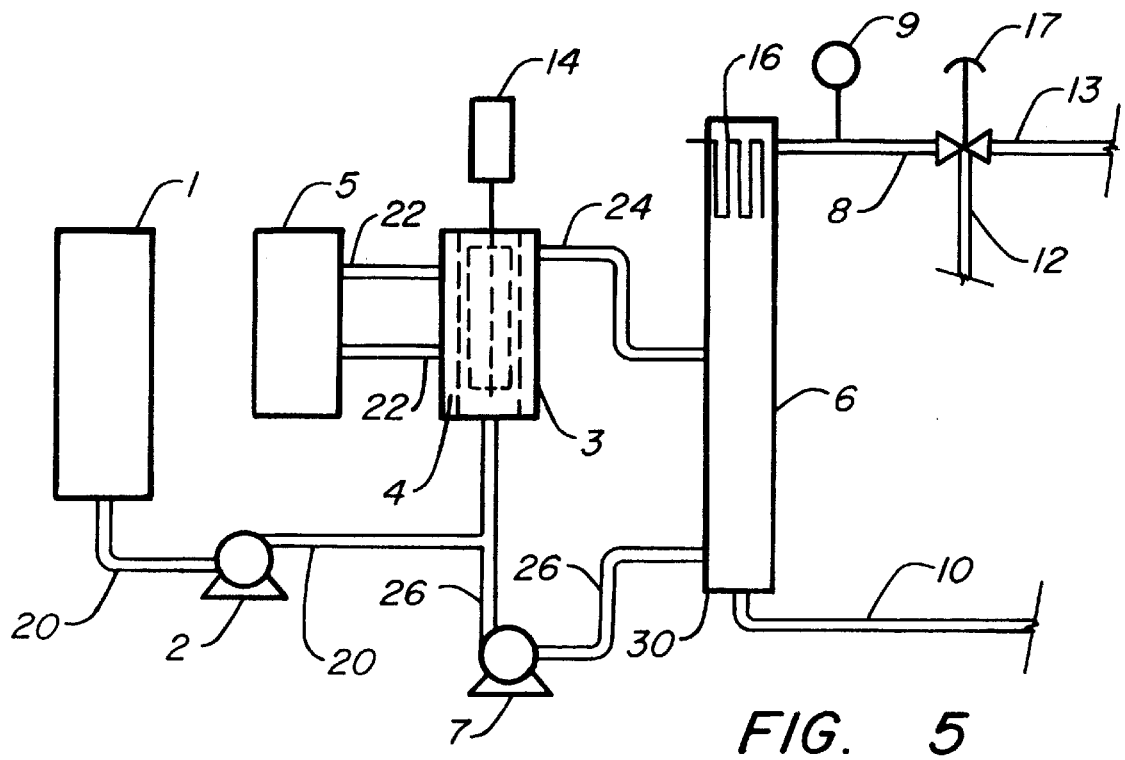
FIG. 5 is a schematic illustration of a modified liquid hydrate regeneration system.

FIG. 5 is a modification of the regeneration system shown in FIG. 4. In this system, an amount of the cooled acid in separator column 6 is recycled back into jacketed reactor 3 through conduit 26 using recycle pump 7. This is used to overcome heat loss or to remove additional heat generated by the formation of other hydrates. In regions of the phase diagram where more than one hydrate can be formed, proper sizing of the combined volumes of reactor 3 and column 6 can allow several hydrates to be formed simultaneously. Control valve 17 responding to a signal from temperature probe 9 can be used to divert the regenerated acid stream into either conduit 12 or conduit 13 allowing for the separation of the regenerated acid into different liquid hydrate fractions. Such a separation essentially enriches one regenerated stream at the expense of the other regenerated stream in order to increase or decrease the acid concentration to that of the hydrate being separated. A heating coil 16 may be added to the top of separator column 6 to melt any inadvertently formed solid hydrates and prevent clogging of adjacent output port 8.

While there has been shown and described what are at the present considered the preferred embodiments of the invention, it will be obvious to those skilled in the art that various changes and modifications may be made therein without departing from the scope of the invention as defined by the appended claims.

I claim:

1. A method for regenerating contaminated sulfuric acid comprising:

(a) cooling the contaminated sulfuric acid to a lower temperature sufficient to form at least one liquid hydrate of sulfuric acid without forming a solid hydrate of sulfuric acid;

(b) maintaining the contaminated sulfuric acid at the lower temperature for a time sufficient to form at least one liquid hydrate of sulfuric acid and precipitate an amount of the contaminant;

(c) separating the precipitated contaminant from the cooled acid; and (d) warming the acid to decompose the liquid hydrate, wherein the mole fraction of sulfuric acid ranges from about 0.02 to about 0.40 and wherein the lower temperature sufficient to form at least one liquid hydrate of sulfuric acid is about 267° K.

2. The method of claim 1, wherein the contaminant is iron.

3. The method of claim 1, wherein the lower temperature has been maintained for a time sufficient to yield a formation time of at least about 6 hours.

4. The method of claim 1, wherein the lower temperature has been maintained for a time sufficient to yield a formation time of at least about 12 hours.

5. The method of claim 1, wherein at least about 40 wt % of the contaminants precipitate out.

6. A method for regenerating an aqueous sulfuric acid composition containing sulfuric acid and an iron contaminant comprising the steps of:

(a) cooling the sulfuric acid composition to a lower temperature sufficient to form at least one liquid hydrate of the sulfuric acid without forming a solid hydrate of sulfuric acid; and (b) maintaining the sulfuric acid composition at the lower temperature for a time sufficient to form at least one liquid hydrate of sulfuric acid and continuing to maintain the acid at the lower temperature until substantially all of the sulfuric acid forms the liquid hydrate to precipitate at least a portion of the iron contaminant;

wherein the mole fraction of sulfuric acid is between about 0.02 to about 0.40, the lower temperature sufficient to form at least one liquid hydrate of sulfuric acid is about 267° K. and the lower temperature has been maintained for a time sufficient to yield a formation time of at least about 6 hours.

7. The method of claim 6 wherein the lower temperature has been maintained for a time sufficient to yield a formation time of at least about 12 hours.

8. The method of claim 6, further comprising the step of:

(c) separating the precipitated contaminants from the liquid hydrate.

9. The method of claim 8, further comprising the step of:

(d) warming the acid to decompose the liquid hydrate.

10. The method of claim 6, wherein at least about 40 wt % of the contaminants precipitate out.

11. A method for regenerating an aqueous contaminated acid composition containing at least one hydratable acid and at least one contaminant comprising the steps of:

(a) cooling the contaminated acid to a lower temperature sufficient to form at least one liquid hydrate of at least one hydratable acid without forming a solid hydrate of the at least one hydratable acid; and (b) maintaining the contaminated acid at the lower temperature for a time sufficient to form a liquid hydrate of at least one hydratable acid and continuing to maintain the acid at the lower temperature until substantially all of the at least one hydratable acid forms the liquid hydrate to precipitate at least a portion of the contaminants;

wherein the mole fraction of the at least one hydratable acid in the contaminated acid composition ranges from 0.02 to 0.40 and wherein the lower temperature sufficient to form at least one liquid hydrate is about 267° K.

12. The method of claim 11, wherein at least about 40 wt % of the contaminants precipitate out.

13. The method of claim 11, wherein the at least one hydratable acid is sulfuric acid.

14. The method of claim 11, wherein the at least one hydratable acid is nitric acid.

15. The method of claim 11, further comprising the step of:

(c) separating the precipitated contaminants from the liquid hydrate.

16. The method of claim 15, further comprising the step of:

(d) warming the acid to decompose the liquid hydrate.

17. The method of claim 11, wherein the contaminant is iron.

18. The method of claim 11, wherein the lower temperature has been maintained for a time sufficient to yield a formation time of at least about 6 hours.

19. The method of claim 11, wherein the lower temperature has been maintained for a time sufficient to yield a formation time of at least about 12 hours.

20. The method of claim 11, wherein at least about 40 wt % of the contaminants precipitate out.

* * * * *